United States Patent

[11] 3,599,481

| | | |
|---|---|---|
| [72] | Inventor | Karl Grimpe<br>Mulheim/Ruhr-Speldorf, Germany |
| [21] | Appl. No. | 24,267 |
| [22] | Filed | Mar. 31, 1970 |
| [45] | Patented | Aug. 17, 1971 |
| [73] | Assignee | Demag Aktiengesellschaft<br>Duisburg, Germany |
| [32] | Priority | Apr. 12, 1969 |
| [33] | | Germany |
| [31] | | P 19 18 689.1 |

[54] TORQUE SUPPORT FOR A TRANSMISSION
10 Claims, 3 Drawing Figs.

[52] U.S. Cl. .................................................... 73/136 R
[51] Int. Cl. ..................................................... G01l 3/02
[50] Field of Search .......................................... 73/141 A,
134, 144, 136

[56] References Cited
UNITED STATES PATENTS
2,642,741   6/1953   DuPont .................... 73/141 (A) X
3,173,292   3/1965   Diehl et al. ................... 73/136 R FOREIGN PATENTS
722,915   7/1942   Germany.

*Primary Examiner*—Charles A. Ruehl
*Attorney*—McGlew and Toren

ABSTRACT: A support for a transmission includes a crossmember in the form of a rotatable rod which is supported at each end on bearing pedestals and which carries a crank lever adjacent each end which is articulated at its outer end to a torque support in the form of a link member. The link member is pivotally connected at its upper end to a respective side of a housing for a transmission for a main shaft with which it is associated. The torque supports on each side of the housing provides means for supporting the transmission centrally over the rotatable rod and the rod may be additionally supported such as by a spring or a fluid pressure cylinder. The torsion stressed rod for the two torque supports may serve as a holder and as a measuring means for the measurement of the torque which is developed at the transmission housing by the associated shaft.

PATENTED AUG 17 1971

3,599,481

Inventor
KARL GRIMPE

BY
McGlew & Toren
ATTORNEYS

TORQUE SUPPORT FOR A TRANSMISSION

SUMMARY OF THE INVENTION

This invention relates in general to supports for shaft transmissions and in particular, to a new and useful torque support on a straddling transmission and in particular, for very large sized machines such as metallurgical converters, dumping mechanisms, tube mills and the like and which provides means for supporting the high reaction moment produced in such machines.

It is known to connect a torque support at the housing of a straddling transmission and to support the reaction moment corresponding to the generated torque through sliding or rolling friction means, or elastic means at a fixed bearing of the foundation. The torque support and the foundation bearings are arranged between one or more rolling bodies and/or on an additional intermediate member moving crosswise and/or endwise. The known torque support acts in one direction of rotation and they may also be designed for reaction moment support for alternating directions of rotation. For two motor drives which include means for torque compensation of the driving pinions of the transmission, it has been known that the frame carrying the driving pinion may be connected to the foundation with the aid of a double-jointed support. In the known torque supports it is a disadvantage that either they do not free the main bearing shaft with the transmission riding thereon from transverse forces which arise from the moment support, or the moment support which is free from transverse forces is obtained only at the expense of a relatively high cost of construction and by making a very large structural sizes.

In accordance with the invention, there is provided means for providing force-free transverse moment support using a relatively low cost structure and requiring relatively small structural volume while still providing a torque support which is double that which is presently obtainable. Such a torque support is arranged so that there is a bilateral symmetry of the support system and a 6 mobility of the rigid transmission. The apparatus of the invention includes a self-enclosed force absorption system which is arranged to free the main bearing shaft and the transmission riding thereon from transverse forces which are induced from the moment support. The system also provides a self-enclosed force absorption system in the form of an elastic support for the purpose of absorbing any occurring impacts, vibrations or the like, or even installation inaccuracies.

In the preferred form, the invention includes the following characteristics:

1. A torque support in the form of a rod member is arranged transversely to the axis of the main shaft of the transmission and it is connected on both sides of the transmission housing through a fixed lever carried on each side of the rod member and a coupling link connected between the end of the lever and a respective side of the transmission housing.

2. At the transmission housing and at the lever, the torque supports are mounted preferably in universally pivotable bearings.

3. The levers on each end of the rotatable rod member or shaft are arranged rotationally stiff with the shaft and they are individually connected with the corresponding torque support or link member. The articulation between the lever and the torque supports for the housing transmission is preferably designed as a universally pivotable bearing.

In accordance with another feature of the invention, the transversely extending rod member may be designed as a spring rod and a central portion thereof may be held against deflection, for example, by spring means or fluid pressure means. With the inventive construction, the reaction moment to be supported which may be relatively great is absorbed in principle by an enclosed forced absorption system. This system comprises the torque support member which is pivotally connected to each side of the transmission housing at their one ends and connected at their opposite respective ends to respective lever members which are carried on the transversely positioned rod member. The two torque supports with the common intermediate rod members form a closed system with the transmission housing itself. The fixed securing occurs through the intermediate levers. The effective reaction moment of the straddling transmission becomes operative because of the arrangement of the double torque supports in the supporting system as a couple of forces, one torque support being under tension, the other under compression. The two support forces which are operative simultaneously and at a distance from each other, and in opposite directions, (the tensile and the compressive force) put the common intermediate member or rod member of the torque supports under torsion. Each support member causes an oppositely directed force to be transmitted to the rod member so that it is twisted. The forces in the zone of the articulated connection of the torque supports with the transmission and the common intermediate member are equal at every point and at all times. The reaction force to the operative supporting force of the particular torque support is absorbed by the support bearing through the intermediate levers and transmitted to the foundation. As the transversely positioned rod member is twisted, the arrangement offers a construction in which a vibration-damping element may be incorporated in this rod member and for this purpose rotationally elastic couplings are preferably suitable. With such an arrangement a harmful vibration system is prevented from building up.

By the use of high-performance universal pivot bearings for micro and extremely small movements of the provided torque supports which engage each side of the transmission housing, the closed system of reaction moment force absorption is coupled in the desired manner to the transmission as well as to the foundation. The construction permits the main bearing shaft and the transmission which rides thereon to be movable in the zone of the torque support system axially, horizontally, vertically as well as in wobbling and transverse directions and in a force-free manner. Because the torque support is designed and arranged with few compact elements which are easily controllable and assessable and interchangeable, it is possible to couple these elements to the transmission along the transverse axis so that the system is transversely force free.

In accordance with another feature of the invention, the transverse rod member may be arranged as a torsion indicator with means for measuring the torque. In addition, it may be supported centrally by spring means or by a hydraulic or fluid pressure support.

Accordingly, it is an object of the invention to provide a torque support for a transmission which is adapted to be connected to a main shaft and which includes a transversely extending rod member which is coupled to the transmission through a lever affixed to each side of the rod member and engaged with a respective torque supporting member which in turn is universally pivotally connected to a respective side of the housing of the transmission.

A further object of the invention is to provide a torque support which straddles a transmission and which includes a supporting member at each side thereof which is held on a lever member affixed to a torsion rod, a torsion rod advantageously being arranged to provide an indication of the torque which is transmitted thereto and it is supported by bearing pedestals at each end and preferably by an additional central supporting means.

A further object of the invention, is to provide a torque support which is simple in design, rugged in construction, and which operates a relatively small space.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
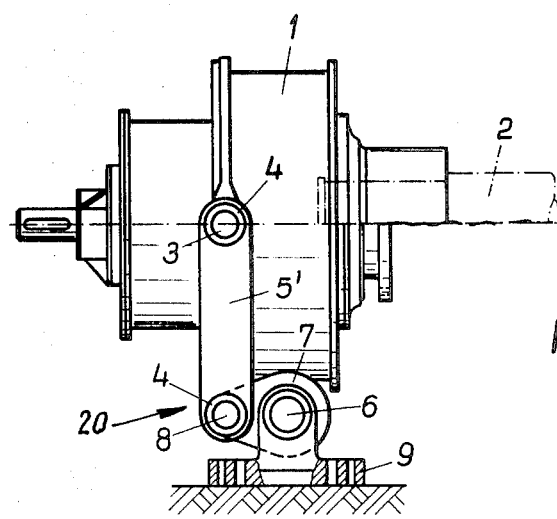
FIG. 1 is a side elevational view partly broken away of a torque support constructed in accordance with the invention.
Figure 2:
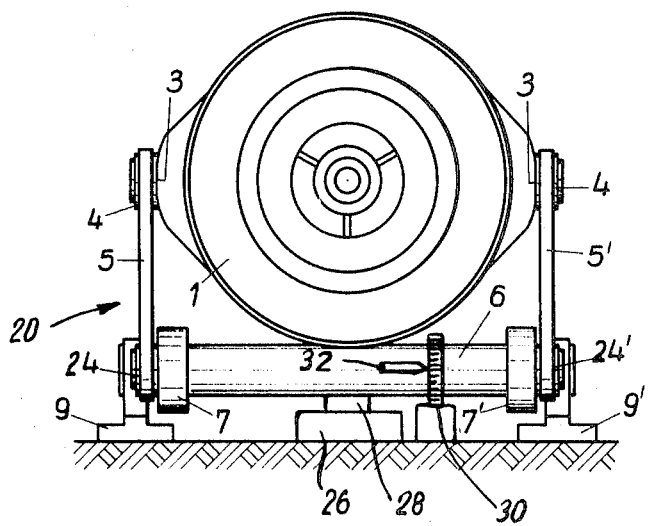
FIG. 2 is a front end elevational view of the torque support of FIG. 1.

Referring to the drawings in particular, the invention embodied therein in FIGS. 1 and 2 comprises a torque support generally designated 20 for supporting the housing 1 of a transmission for a main shaft 2.

In accordance with the invention, the torque support includes a torque support members or links 5, 5' which are engaged with respective sides of the transmission housing at journals 3 which are provided therefore. The torque support 5 engages the journals by a universal pivotal bearing construction 4 which provides a pivotal support for movement in all directions of the housing 1 at each side thereof.

As seen in FIG. 2, the torque supports 5 and 5' are connected at their respective opposite lower ends to the outer ends of respective levers or crank members 7 and 7'. The connection of the torque support members 5 and 5' to the respective levers 7 and 7' is through a universal bearing 24 and 24' respectively.

The levers 7 and 7' are carried at respective opposite ends of a rod member or shaft 6 and they are affixed thereto in a rotation stiff manner. The rod member 6 is rotatably supported on end pedestals 9 and 9' respectively. The bearings of these pedestals may also be designed as universal pivotal bearings or alternatively as a self-aligning roller bearing. The rod member 6 may advantageously be a spring rod which may twist under the influence of a torsion applied to each end thereof through the torque support 5 and 5' respectively.

Figure 3:
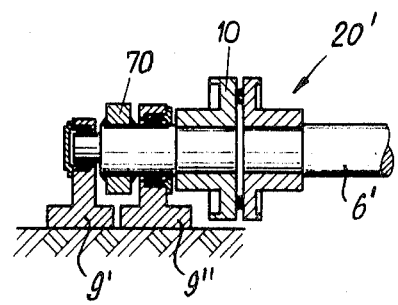
FIG. 3 is a partial transverse sectional view of another embodiment of torque support.

In the embodiment of FIG. 3, two bearing pedestals 9' and 9'' are employed for rotatably supporting the end of a rod member 6' and a lever member 70 comparable to the lever member 7 and 7' of FIG. 1, is supported between the bearing pedestals 9' and 9''. In this construction, the rod member 6' includes a coupling 10 which permits rotational elasticity for the rod member 6'. When the coupling 10 is employed the impact stresses will be absorbed thereby.

In some instances, it is desirable to employ a support or spring means centrally of the rod member 6 and as indicated in FIG. 2, such means includes a fluid pressure cylinder 26 and a piston 28 which is slidable therein and which is biased upwardly against the center of the rod member 6. A further advantageous feature is the inclusion of an indicator 30 which is arranged around a rod member 6. The indicator is graduated to indicate the torsion to which the rod member 6 is subjected by an indicator 32 which is carried thereon. Dependent on the actual existing torsion on the rod member 6, the actual reaction moment can be measured and indicated by measuring the existing torsional angle of this member. The same sort of measurement can be accomplished by use of coupling 10 in the construction of FIG. 3. The advantage of employing the support 20 for the measurement of the torque in a stationary part such as the rod member 6 is that it limits the expenditure for auxiliary torque measuring means such as slip rings and the like which are required for the known measuring devices.

What I claim is:

1. A torque support for a transmission having a housing, comprising first and second torque support members having first ends which are adapted to be respectively pivotally connected to respective opposite sides of the housing and having opposite ends, a rod member extending transversely between said first and second members, means rotatably supporting said rod member, and first and second lever members affixed to said rod member at axially spaced locations and being pivotally connected to the respective opposite ends of said first and second torque support members, the torque being generated by operation of the transmission being transmitted through the housing to the said first and second torque support members and to said first and second lever members to said rod member.

2. A torque support, according to claim 1, including universal pivot means connected to the first ends of said first and second torque support members for universally pivotally supporting said members to the housing of each transmission.

3. A torque support, according to claim 1, wherein the pivotal connection between said first and second lever members and respective first and second torque support members comprises a universal joint.

4. A torque support, according to claim 3, wherein said first and second torque support members have universal joints adjacent said first ends for universally pivoting connecting said first ends to said housing.

5. A torque support, according to claim 1, wherein said rod member comprises a spring rod.

6. A torque support, according to claim 1, including means located intermediate the length of said rod member for additionally supporting said rod member.

7. A torque support, according to claim 6, wherein said means for additionally supporting said rod member comprises spring means engaging said rod member centrally between the means rotatably supporting each end of said rod member.

8. A torque support, according to claim 1, wherein said rod member includes a vibration-damping element.

9. A torque support, according to claim 8, wherein said vibration-damping element comprises a rotation-elastic coupling.

10. A torque support, according to claim 1, including torque-measuring means associated with said rod member for indicating the torsional deflection thereof.